US008019916B2

(12) United States Patent
Hsiao et al.

(10) Patent No.: US 8,019,916 B2

(45) Date of Patent: Sep. 13, 2011

(54) MOBILE COMMUNICATION TERMINAL SYSTEM

(75) Inventors: Ming-Jun Hsiao, Zhubei (TW); Han-Min Cheng, Jhubei (TW); Chih-Chan Yen, Jhubei (TW)

(73) Assignee: Alpha Imaging Technology Corp., Hsinchu County (TW)

( * ) Notice: Subject to any disclaimer, the term of this patent is extended or adjusted under 35 U.S.C. 154(b) by 161 days.

(21) Appl. No.: 12/479,012

(22) Filed: Jun. 5, 2009

(65) Prior Publication Data

US 2009/0307397 A1 Dec. 10, 2009

(30) Foreign Application Priority Data

Jun. 10, 2008 (TW) ............................... 97121519 A

(51) Int. Cl.
*G06F 3/00* (2006.01)

(52) U.S. Cl. ........................................... 710/36; 710/15

(58) Field of Classification Search ........................ None
See application file for complete search history.

(56) References Cited

U.S. PATENT DOCUMENTS

2006/0184987 A1* 8/2006 Allen et al. .................. 725/100
2008/0109587 A1* 5/2008 Greenhalgh et al. .......... 710/316

OTHER PUBLICATIONS

Drude et al., System Architecture for a Multi-Media enabled Mobile Terminal, 2005, IEEE, pp. 435-436.*

* cited by examiner

*Primary Examiner* — Eron J Sorrell
(74) *Attorney, Agent, or Firm* — Rabin & Berdo, P.C.

(57) ABSTRACT

A mobile communication terminal system includes a serial interface port, a multimedia output/input module, a multimedia processor, a frequency-signal output/input module, and a baseband processor. The serial interface port is coupled to a computer system via a serial interface. The multimedia output/input module provides a first input signal. The multimedia processor processes the first input signal to generate a first serial interface signal. The frequency-signal output/input module provides a second input signal. The baseband processor processes the second input signal to generate a second serial interface signal to the multimedia processor. The multimedia processor selectively establishes one of a communication connection between the multimedia processor and the serial interface port and a communication connection between the baseband processor and the serial interface port to correspondingly output one of the first serial interface signal and the second serial interface signal to the computer system via the serial interface port.

11 Claims, 4 Drawing Sheets

MOBILE COMMUNICATION TERMINAL SYSTEM

This application claims the benefit of Taiwan application Serial No. 97121519, filed Jun. 10, 2008, the subject matter of which is incorporated herein by reference.

BACKGROUND OF THE INVENTION

1. Field of the Invention

The invention relates in general to a multimedia processor, and more particularly to a multimedia processor incorporating a serial interface switching function.

2. Description of the Related Art

Along with technology development, serial interface, such as universal serial bus (USB), has been widely used in various applications, such as data transmission of a handheld communication device, in modern times. In today's technology, the mobile phone normally includes a processor having a USB module, and a USB port coupled to the USB module. By this design, the data transmission of the processor can be performed via the USB port.

Generally speaking, the mobile phone has two or more than two processors to respectively perform different types of data processing. However, a mobile phone has a volume normally capable of containing one USB port only. Therefore, conventionally, a switching circuit is needed for switching two or more than two processors to couple with a USB wiring of the USB port, thereby increasing the circuit volume and cost.

SUMMARY OF THE INVENTION

The invention is directed to a mobile communication terminal system including a multimedia processor (MMP) capable of incorporating a serial interface switching circuit. Compared with the conventional handheld communication device, the mobile communication terminal system of the invention has the advantages of smaller circuit volume and lower circuit cost.

According to the present invention, a mobile communication terminal system is provided. The mobile communication terminal system includes a serial interface port, a multimedia output/input module, a multimedia processor, a frequency-signal output/input module, and a baseband processor. The serial interface port is coupled to a computer system via a serial interface. The multimedia output/input module is for providing a first input signal. The multimedia processor is for processing the first input signal to generate a first serial interface signal. The frequency-signal output/input module is for providing a second input signal. The baseband processor is for processing the second input signal to generate a second serial interface signal to the multimedia processor. The multimedia processor is for selectively establishing one of a communication connection between the multimedia processor and the serial interface port and a communication connection between the baseband processor and the serial interface port to correspondingly output one of the first serial interface signal and the second serial interface signal to the computer system via the serial interface port.

The invention will become apparent from the following detailed description of the preferred but non-limiting embodiments. The following description is made with reference to the accompanying drawings.

DETAILED DESCRIPTION OF THE INVENTION

The mobile communication terminal system of the embodiment includes a multimedia processor (MMP) capable of incorporating a serial interface switching circuit.

Figure 1:
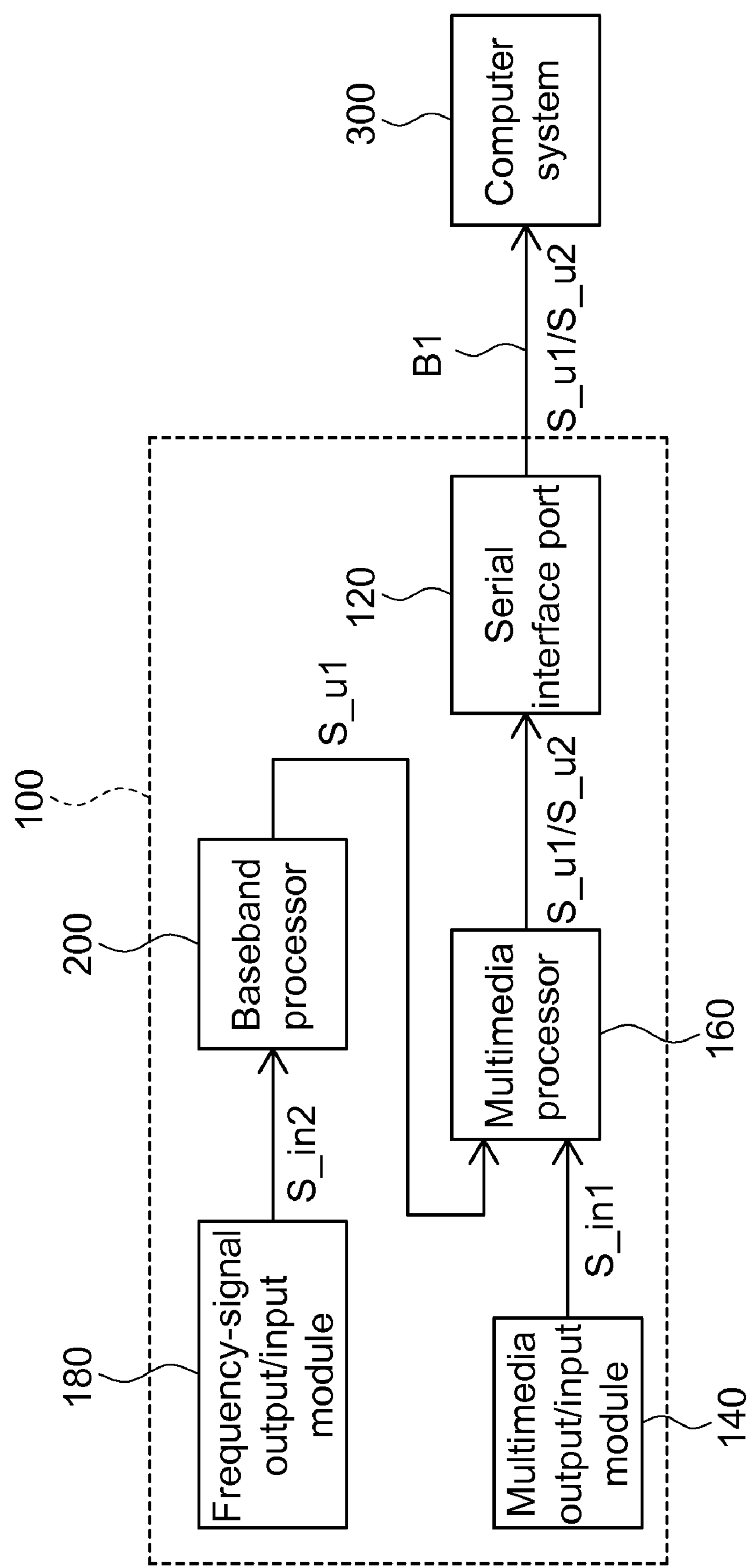
FIG. 1 shows a block diagram of a mobile communication terminal system according to a preferred embodiment of the invention.

Referring to FIG. 1, a block diagram of a mobile communication terminal system according to a preferred embodiment of the invention is shown. The mobile communication terminal system 100 includes a serial interface port 120, a multimedia output/input module 140, a multimedia processor 160, a frequency-signal output/input module 180 and a baseband processor 200. The serial interface port 120 is coupled to a computer system 300 via a serial interface B1. For example, the serial interface B1 is a universal serial bus (USB). In other example, the serial interface B1 may also be other kind of serial communication interface.

The multimedia output/input module 140 is for providing an input signal S_in1. The multimedia processor 140 is for processing the input signal S_in1 to generate a serial interface signal S_u1. The frequency-signal output/input module 180 is for providing an input signal S_in2. The baseband processor 200 is for processing the input signal S_in2 to generate and output a serial interface signal S_u2 to the multimedia processor 160.

The multimedia processor 160 is for selectively establishing one of a communication connection between the multimedia processor 160 and the serial interface port 120 and a communication connection between the baseband processor 200 and the serial interface port 120 to correspondingly output one of the serial interface signals S_u1 and S_u2 to the computer system 300 via the serial interface port 120. In the following description, the mobile communication system of the embodiment will be further illustrated by a few examples.

Figure 2:
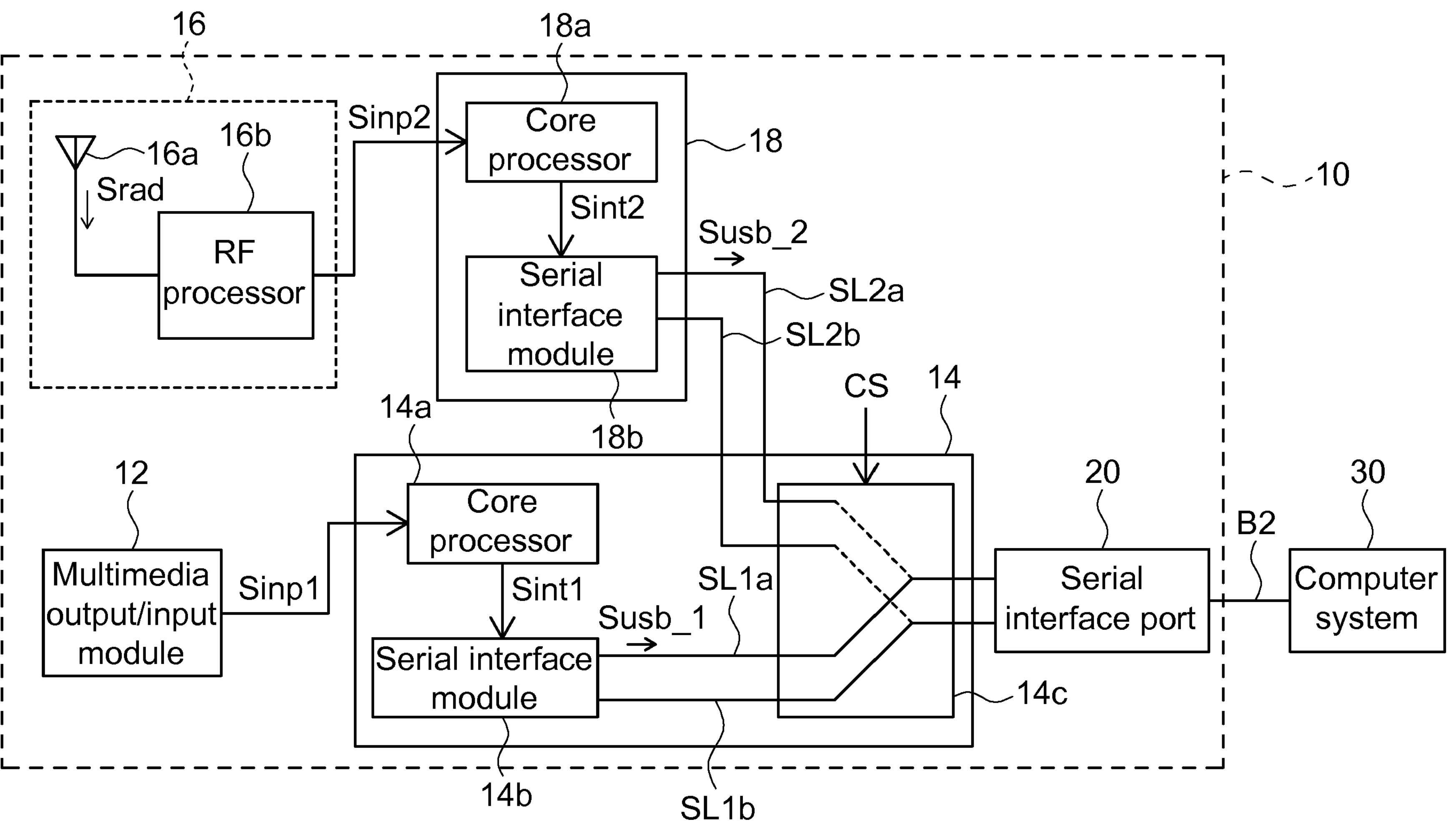
FIG. 2 shows a detailed block diagram of the mobile communication terminal system according to the preferred embodiment.

The multimedia processor of the mobile communication terminal system of the embodiment includes a signal selection circuit for selectively outputting one of the serial interface signal generated by the multimedia processor and the serial interface signal generated by the baseband processor. Referring to FIG. 2, a detailed block diagram of the mobile communication terminal system according to the preferred embodiment is shown. The mobile communication terminal system 10 includes a multimedia output/input module 12, a multimedia processor 14, a frequency-signal output/input module 16, a baseband processor 18 and a serial interface port 20.

In one example, the frequency-signal output/input module 16 includes a radio-frequency (RF) antenna 16*a* and a RF processor 16*b*. The RF processor 16*b* includes a filter and a RF transceiver (not shown in the figure). The frequency-signal output/input module 16 is for receiving and processing a RF signal Srad to generate an input signal Sinp2.

The baseband processor 18 includes a core processor 18*a* and a serial interface module 18*b*. For example, the serial interface module 18*b* is a serial interface client device controlled by a serial interface host device to perform data transmission. In the embodiment, the computer system 30 includes the serial interface host device for generating commands to control the serial interface client device to perform the corresponding operations.

The core processor 18*a* is for executing a number of algorithms on the input signal Sinp2 to generate an internal signal Sint2 according to the input signal Sinp2 and output the internal signal Sint2 to the multimedia processor 14. For example, the core processor 18*a* of the baseband processor 18 is for executing a part of or all the algorithms of channel stability, signal synchronization, transmission-rate match and error correction to generate the internal signal Sint2 according to the input signal Sinp2. The serial interface module 18*b* generates a serial interface signal Susb_2 according to the internal signal Sint2.

In one example, the multimedia output/input module 16 is a flash controller for accessing a flash memory (not shown in the figure) to generate the input signal Sinp1.

The multimedia processor 14 includes a core processor 14*a* and a serial interface module 14*b*. For example, the serial interface module 14*b* is a serial interface client device controlled by a serial interface host device of the computer system 30 to perform the corresponding operations. The core processor 14*a* is for executing a number of algorithms on the input signal Sinp1 to generate an internal signal Sint1 according to the input signal Sinp1. For example, the multimedia processor 14*a* is for executing audio-video data encoding/decoding or compressing/decompressing algorithms to generate the internal signal Sint1 according to the input signal Sinp1. The serial interface module 14*b* generates a serial interface signal Susb_1 according to the internal signal Sint1.

The multimedia processor 14 further includes a signal selection circuit 14*c*. The signal selection circuit 14*c* has input terminals coupled to the serial interface modules 14*b* and 18*b* for correspondingly receiving the serial interface signals Susb_2 and Susb_1, and an output terminal coupled to the serial interface port 20. The signal selection circuit 14*c* is further for correspondingly providing the serial interface signals Susb_1 and Susb_2 to the serial interface port 20 in response to different levels of a control signal CS.

In detail, the serial interface module 14*b* respectively output data signals D+ and D− of the serial interface signal Susb_1 via wirings SL1*a* and SL1*b*, and the serial interface module 18*b* respectively outputs serial interface signals D+ and D− of the serial interface signal Susb_2 via wirings SL2*a* and SL2*b*. For example, the signal selection circuit 14*c* of the embodiment is a multiplexer for providing the data signals of the wirings SL1*a* and SL1*b* to the serial interface port 20 in response to a first level of the control signal CS, and providing the data signals of the wirings SL2*a* and SL2*b* to the serial interface port 20 in response to a second level of the control signal CS. The serial interface port 20 transmits the received data signals D+, D−, high voltage signal and ground voltage signal to the computer system 30 via a serial interface B2.

Therefore, the mobile communication terminal system 10 of the embodiment can effectively use the signal selection circuit 14*c* incorporated in the multimedia processor 14 to selectively output the serial interface signal Susb_1 generated by the multimedia processor 14 and the serial interface signal Susb_2 generated by the baseband processor 18 to the computer system 30.

Figure 3:
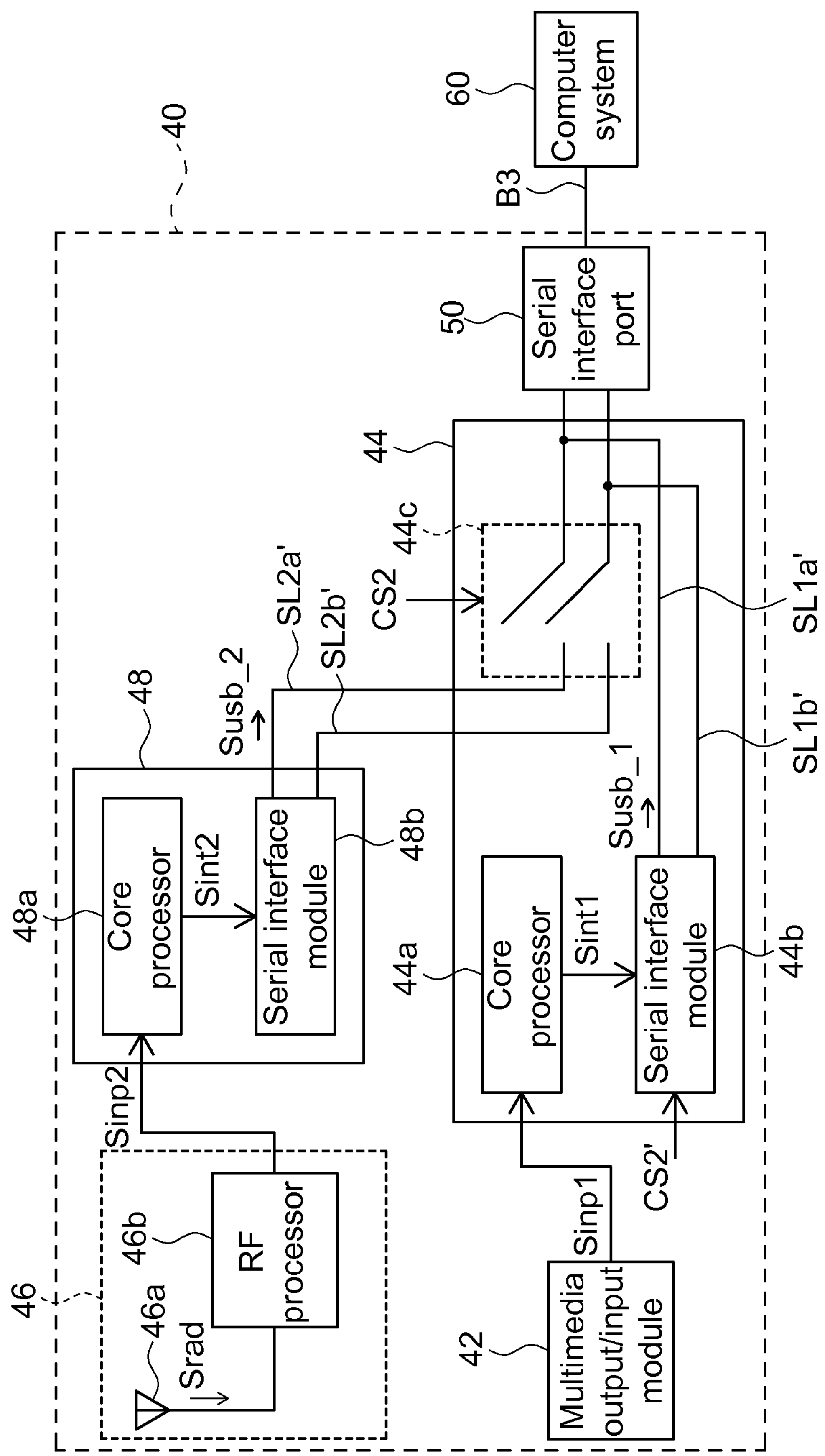
FIG. 3 shows another detailed block diagram of the mobile communication terminal system according to the preferred embodiment of the invention.

In the embodiment, although the signal selection circuit 14*c* is exemplified to be a multiplexer for illustration, the signal selection circuit 14*c* of the embodiment is not limited thereto. Referring to FIG. 3, another detailed block diagram of the mobile communication terminal system according to the preferred embodiment of the invention is shown. In another example, the signal selection circuit 44*c* is substantially a switch circuit. A first set of input terminals of the switch circuit are coupled to a baseband processor 48 via wirings SL2*a*' and SL2*b*'. A second set of input terminals of the switch circuit are coupled to a serial interface port 50.

The switch circuit is turned on in response to a control signal CS2 to transmit the serial interface signal Susb_2 on the wirings SL2*a*' and SL2*b*' to the serial interface port 20. The difference between the multimedia processor 44 of the example and the multimedia processor 14 of FIG. 2 lies in that the serial interface module 44*b* of the multimedia processor 44 is further controlled by a control signal CS2'. In response to the control signal CS2', the serial interface module 44*b* has high impedance at the output terminal when the switch circuit is turned on, and provides the serial interface signal Susb_1 when the switch circuit is turned off. Therefore, the multimedia processor 44 in the example, can still effectively output the serial interface signals Susb_1 and Susb_2 at different periods of time. For example, the serial interface module 44*b* is a serial interface client device complying with the serial interface 2.0 specification.

Figure 4:
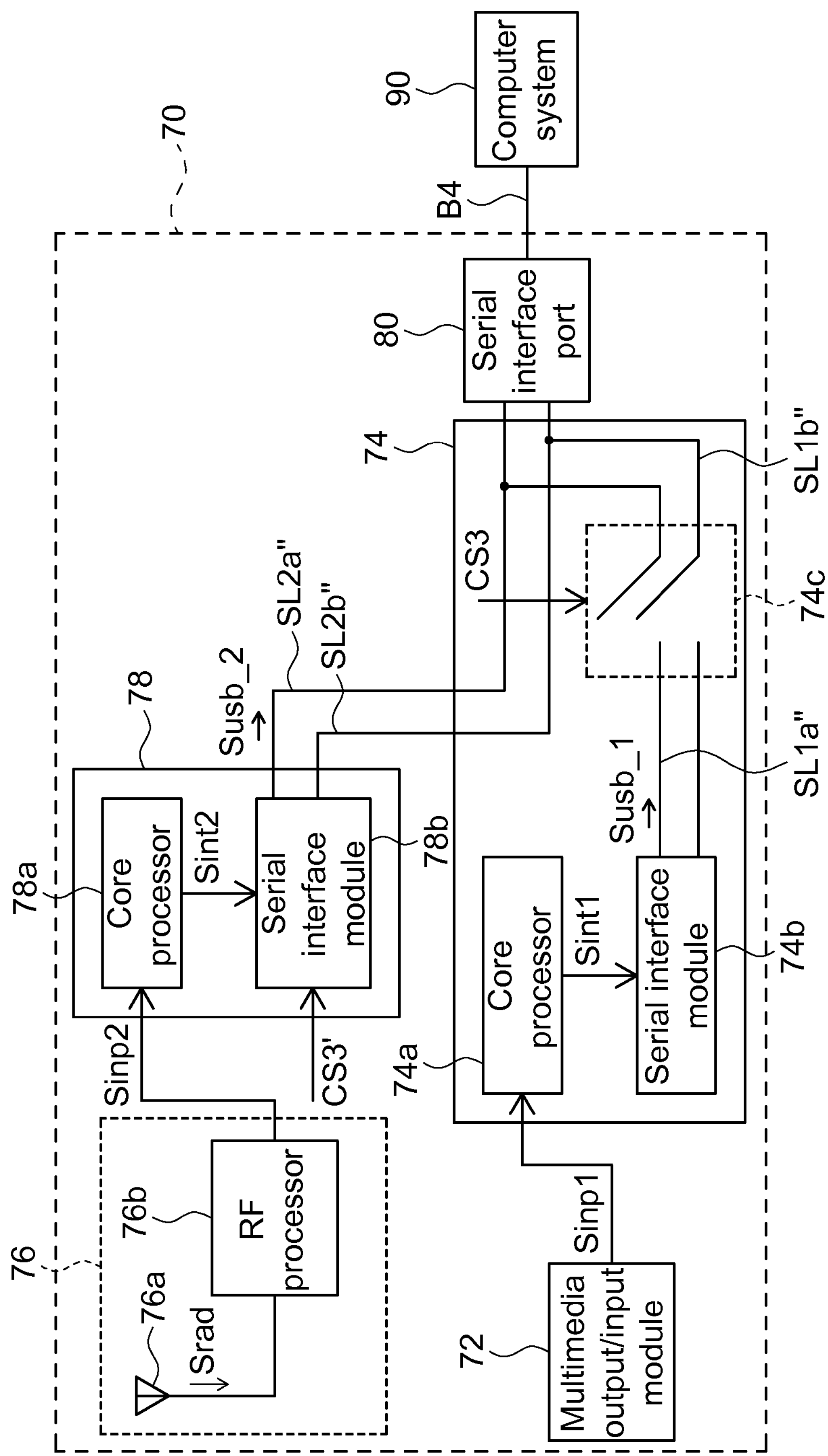
FIG. 4 shows another detailed block diagram of the mobile communication terminal system according to the preferred embodiment of the invention.

Referring to FIG. 4, another detailed block diagram of the mobile communication terminal system according to the preferred embodiment of the invention is shown. In another example, the switch circuit of the signal selection circuit 74 is turned on in response to a control signal CS3 to transmit the serial interface signal Susb_2 on wirings SL2*a*" and SL2*b*" to a serial interface port 80. The difference between the baseband processor 78 of the example and the baseband processor 18 of FIG. 2 lies in that the serial interface module 78*b* of the baseband processor 78 is further controlled by a control signal CS3'. In response to the control signal CS3', the serial interface module 78*b* has high impedance at the output terminal when the switch circuit is turned on and provides the serial interface signal Susb_2 when the switch circuit is turned off. Therefore, the multimedia processor 74 can still effectively provide the serial interface signals Susb_1 and Susb_2 at different periods of time. For example, the serial interface module 78*b* is a serial interface client device complying with the serial interface 2.0 specification.

In the embodiment, although the multimedia output/input module 12 is exemplified to be a flash controller for illustration, the multimedia output/input module 12 is not limited thereto and can be any other multimedia input circuit. For example, the multimedia output/input module 12 can be an image sensor used as a sensing device on lens of a camera for providing the sensed image to the multimedia processor 14 to perform the corresponding operations.

In the embodiment, although the frequency-signal output/input module 16 is exemplified to include a RF antenna 16*a* and a RF processor 16*b* for illustration, the frequency-signal output/input module 16 is not limited thereto and can be any other circuit for providing frequency signals.

In the embodiment, although the multimedia processor 12 is exemplified to include the core processor 14*a*, the serial interface module 14*b* and the signal selection circuit 14*c* for illustration, the multimedia processor 14 is not limited thereto. For example, the multimedia processor of the embodiment further includes functional modules, such as a panel driving module for driving a liquid crystal display panel and a TV video module for generating TV video output signals.

The mobile communication terminal system of the embodiment can effectively use the signal selection circuit incorporated in the multimedia processor to selectively output the serial interface signal generated by the multimedia processor and the serial interface signal generated by the baseband processor to the computer system. Therefore, compared with the conventional handheld communication device, the mobile communication terminal system of the embodiment has the advantages of smaller circuit volume and lower circuit cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile communication terminal system, comprising:

a serial interface port, coupled to a computer system via a serial interface;

a multimedia output/input module, for providing a first input signal;

a multimedia processor, for processing the first input signal to generate a first serial interface signal;

a frequency-signal output/input module, for providing a second input signal; and a baseband processor, for processing the second input signal to generate a second serial interface signal to the multimedia processor;

wherein the multimedia processor is for selectively establishing one of a communication connection between the multimedia processor and the serial interface port and a communication connection between the baseband processor and the serial interface port to correspondingly output one of the first serial interface signal and the second serial interface signal to the computer system via the serial interface port.

2. The mobile communication terminal system according to claim 1, wherein the multimedia processor comprises:

a first core processor, for processing the first input signal to generate a first internal signal; and a first serial interface module, for processing the first internal signal to generate the first serial interface signal.

3. The mobile communication terminal system according to claim 2, wherein the multimedia processor comprises:

a signal selection circuit, comprising a first input terminal coupled to the baseband processor and a second input terminal coupled to the serial interface port, wherein the signal selection circuit is turned on in response to a first control signal to provide the second serial interface signal to the serial interface port.

4. The mobile communication terminal system according to claim 3, wherein the first serial interface module is coupled to an output terminal of the signal selection circuit, and in response to a second control signal, the first serial interface module has high impedance at the output terminal when the signal selection circuit is turned on and provides the first serial interface signal when the signal selection circuit is turned off.

5. The mobile communication terminal system according to claim 2, wherein the multimedia processor comprises:

a signal selection circuit, comprising a first input terminal coupled to the first serial interface module and a second input terminal coupled to the serial interface port, wherein the signal selection circuit is turned on in response to a first control signal to provide the first serial interface signal to the serial interface port.

6. The mobile communication terminal system according to claim 5, wherein the baseband processor comprises:

a second core processor, for processing the second input signal to generate a second internal signal; and a second serial interface module, coupled to an output terminal of the signal selection circuit for processing the second internal signal to generate the second serial interface signal;

wherein, in response to a second control signal, the second serial interface module has high impedance at the output terminal when the signal selection circuit is turned on and provides the second serial interface signal when the signal selection circuit is turned off.

7. The mobile communication terminal system according to claim 2, wherein the baseband processor comprises:

a second core processor, for processing the second input signal to generate a second internal signal; and a second serial interface module, coupled to an output terminal of the multimedia processor for processing the second internal signal to generate the second serial interface signal.

8. The mobile communication terminal system according to claim 7, wherein the multimedia processor comprises:

a signal selection circuit, comprising a first input terminal coupled to the first serial interface module and a second input terminal coupled to the second serial interface module to respectively receive the first serial interface signal and the second serial interface signal, wherein the signal selection circuit respectively provides the first serial interface signal and the second serial interface signal to the serial interface port in response to a first level and a second level of a control signal.

9. The mobile communication terminal system according to claim 2, wherein the frequency-signal output/input module comprises:

a radio-frequency (RF) antenna, for receiving a RF input signal; and a RF processor, for processing the RF input signal to generate the second input signal.

10. The mobile communication terminal system according to claim 1, wherein the multimedia output/input module comprises:

a flash controller, for accessing a flash memory to obtain the first input signal.

11. The mobile communication terminal system according to claim 1, wherein the multimedia output/input module comprises:

an image sensor, for sensing an image operation event to obtain the first input signal.

* * * * *